US008882205B2

(12) United States Patent
Clark, II

(10) Patent No.: US 8,882,205 B2
(45) Date of Patent: Nov. 11, 2014

(54) SPINNER FOR VEHICLE WHEEL

(76) Inventor: Michael Todd Clark, II, Southfield, MI (US)

( * ) Notice: Subject to any disclaimer, the term of this patent is extended or adjusted under 35 U.S.C. 154(b) by 368 days.

(21) Appl. No.: 13/385,482

(22) Filed: Feb. 22, 2012

(65) Prior Publication Data

US 2012/0223571 A1 Sep. 6, 2012

Related U.S. Application Data

(60) Provisional application No. 61/464,275, filed on Mar. 2, 2011.

(51) Int. Cl.
*B60B 7/20* (2006.01)
*B60B 7/04* (2006.01)
*B60B 7/00* (2006.01)
*B60B 7/06* (2006.01)

(52) U.S. Cl.
CPC . *B60B 7/006* (2013.01); *B60B 7/04* (2013.01); *B60B 7/063* (2013.01); *B60B 2900/572* (2013.01); *B60B 7/008* (2013.01)
USPC .................................................. 301/37.25

(58) Field of Classification Search
CPC ............ B60B 7/063; B60B 7/008; B60B 7/20
USPC ............... 301/37.102, 37.25, 37.106, 37.108, 301/37.109; 40/587
See application file for complete search history.

(56) References Cited

U.S. PATENT DOCUMENTS

| | | |
|---|---|---|
| 3,158,946 A | 12/1964 | Upchurch |
| 3,219,391 A | 11/1965 | Hetinger |
| 3,722,958 A | 3/1973 | Marshall |
| 5,290,094 A | 3/1994 | Dragg |
| 5,659,989 A * | 8/1997 | Hsiao et al. ..................... 40/587 |
| 6,309,027 B1 * | 10/2001 | Smith ....................... 301/37.109 |
| 6,554,370 B2 * | 4/2003 | Fowlkes ..................... 301/37.25 |
| 6,575,537 B1 * | 6/2003 | Wang ......................... 301/37.23 |
| 6,637,830 B1 | 10/2003 | Burgess |
| 6,655,061 B1 | 12/2003 | Good |
| 6,663,187 B2 | 12/2003 | Fitzgerald |
| 6,702,396 B1 | 3/2004 | Wang |
| 6,942,303 B2 * | 9/2005 | Smith et al. ................. 301/37.25 |
| 7,014,273 B1 | 3/2006 | Yang et al. |
| 7,100,995 B2 | 9/2006 | Gilly et al. |
| 7,354,113 B2 | 4/2008 | Marriott |
| 2004/0183359 A1 * | 9/2004 | Fowlkes ................... 301/37.101 |
| 2005/0093362 A1 * | 5/2005 | Alicea ........................ 301/37.25 |
| 2005/0231023 A1 * | 10/2005 | Smith et al. ................. 301/37.25 |
| 2006/0049685 A1 * | 3/2006 | Fultz et al. ................. 301/37.25 |
| 2006/0220440 A1 * | 10/2006 | Treacy ....................... 301/37.25 |

* cited by examiner

Primary Examiner — Kip T Kotter
(74) Attorney, Agent, or Firm — Mitchell Intellectual Property Law, PLLC

(57) ABSTRACT

A vehicle wheel spinner comprising a donut shaped housing having a front and back ring forming a cavity therein. The front ring has a series of apertures formed therein. A spinning ring is rotatably mounted within said cavity. Various visual effects are produced by providing on the surface of the spinning ring facing the front ring of said housing at least one section of a contrasting color to the remainder of the surface. When the spinning ring rotates the colors show through said aperture(s) during rotation of the spinning ring. The wheel spinner is attached to the vehicle wheel in a manner that the housing rotates with the wheel and the spinning ring rotates separately from the rotation of the housing and continues to rotate for a time after the wheel stops rotating.

8 Claims, 4 Drawing Sheets

SPINNER FOR VEHICLE WHEEL

RELATED APPLICATIONS

The present application relates to and claims priority to U.S. Provisional Application No. 61/464,275 entitled "SPINNER FOR VEHICLE WHEEL" filed March, 2011, herein incorporated by reference in its entirety.

TECHNICAL FIELD

The invention generally pertains to a wheel spinner device for attachment to a vehicle wheel that contains a spinner that spins independently of the wheel itself.

BACKGROUND OF THE INVENTION

It has been reported in the literature that the original free-spinning spinner was made in the 1980s. However, revolving wheel disc covers were previously reported in U.S. Pat. Nos. 3,158,946 and 3,219,391. Examples of other wheel spinners have been disclosed in U.S. Pat. Nos. 6,554,370; 6,655,061; 6,945,609; 7,014,273; 7,100,995; 7,121,631 and 7,182,408. None of these patents each or suggest the novel wheel spinner taught and claimed herein.

Wheel spinners have been used on vehicles such as automobiles, SUV's, motorcycles and trucks to provide a novel visual effect of a part spinning at different speeds than the wheel and to continue to spin when the vehicle has stopped.

The development of wheel spinners has primarily focused on a spinner device attached to a vehicle wheel (rim) that rotates at a different speed than the wheel and continues to rotate when the vehicle stops. Most of these spinners have one common feature; they attach to the center of the rim and rotate essentially within the area of the rim itself. The spinner portion is usually a non-enclosed spinning blade or spokes that can cause a danger to anyone, especially small children, who may place his or her finger into the wheel while it is still spinning. Also the spinners are limited to spinning spokes or blades with no ability to show motion that is created by color changes. Finally the spinning elements are open to the environment and thus, salt ice, packed snow and the like can affect the performance of the spinner. Lastly the spinner is located in the center of the wheel and does not hide at least a portion of the tire. An object of the present invention is to provide a novel aesthetic effect through the use of a unique spinner device and color changes. Another object is to improve upon the negative features of prior spinners.

SUMMARY OF THE INVENTION

A donut shaped spinning device for a vehicle wheel is disclosed comprising: a donut shaped housing having a front and back ring forming a cavity therein, the front ring containing at least one decorative aperture formed therein; a spinning ring mounted within the cavity of the housing in a manner that the spinning ring rotates upon rotation of the wheel and continues to rotate for a time after the wheel stops, said surface of the spinning ring facing the front ring of said housing having one section of a contrasting color to the remainder of the spinning ring such that when it rotates the colors showing through said aperture change during rotation of the spinning ring, and means for attaching the housing to the vehicle wheel in a manner that the housing rotates with the wheel and the spinning ring rotates separately from the rotation of the housing and continues to rotates for a time after the wheel stops rotating.

The primary object of the invention is to improve on the known spinners by providing a donut shaped wheel spinning device 10, comprising housing 11 that encloses in its cavity a freely rotatable flat spinning ring 12 having at least one contrasting color portion 13 on the front surface.

The face of the housing includes apertures 14 extending through a least a portion of the face. The spinning device can be constructed for example by assembling three flat rings: a front ring 15 that has a series of apertures of various design 14 such that when the internal spinning flat ring 12 rotates it forms a visual effect caused by the contrasting colored portion 13 passing by the open design of the front ring: a back ring 16; two spacers, an inner spacer 17 and an outer spacer 18 interposed between the front and the back rings; and positioned in the housing 11 formed by the front and back rings and the two spacers the freely rotating flat spinning ring 12. When assembled the front and back rings along with the spacers form the housing 11 in which the spinning flat ring 12 is rotatably mounted. The assembled spinning device 10 is attached to the wheel 31 of an automobile, motorcycle, truck and the like in any suitable manner such as by torsion bolts, clips and the like. The inner circumference of spinning flat ring 12 sits on bearings 19 and is urged into rotation when the wheel turns and continues to spin when the wheel stops rotating thus continuing the visual effect. Since the housing is attached to the wheel the housing rotates with the wheel and stops when the wheel stops.

The spinning device may, in one embodiment, be sealed to the environment so that weather conditions do not affect its performance.

In another embodiment the spinning device hides at least a portion of the tire.

These and other objects and advantages of the present invention will become apparent from the subsequent detailed description of the embodiments and the appended claims taken in conjunction with the accompanying drawings. It should be kept in mind that the following description will teach various embodiments of the invention but the invention is not so limited.

BRIEF DESCRIPTION OF THE DRAWINGS

The corresponding numbers in the different views refer to the same part. Only an illustrative view of the fasteners are shown. In order to more clearly illustrate the fitting and association of the parts they are not necessarily drawn to scale.

DETAILED DESCRIPTION OF THE INVENTION

Figure 1:
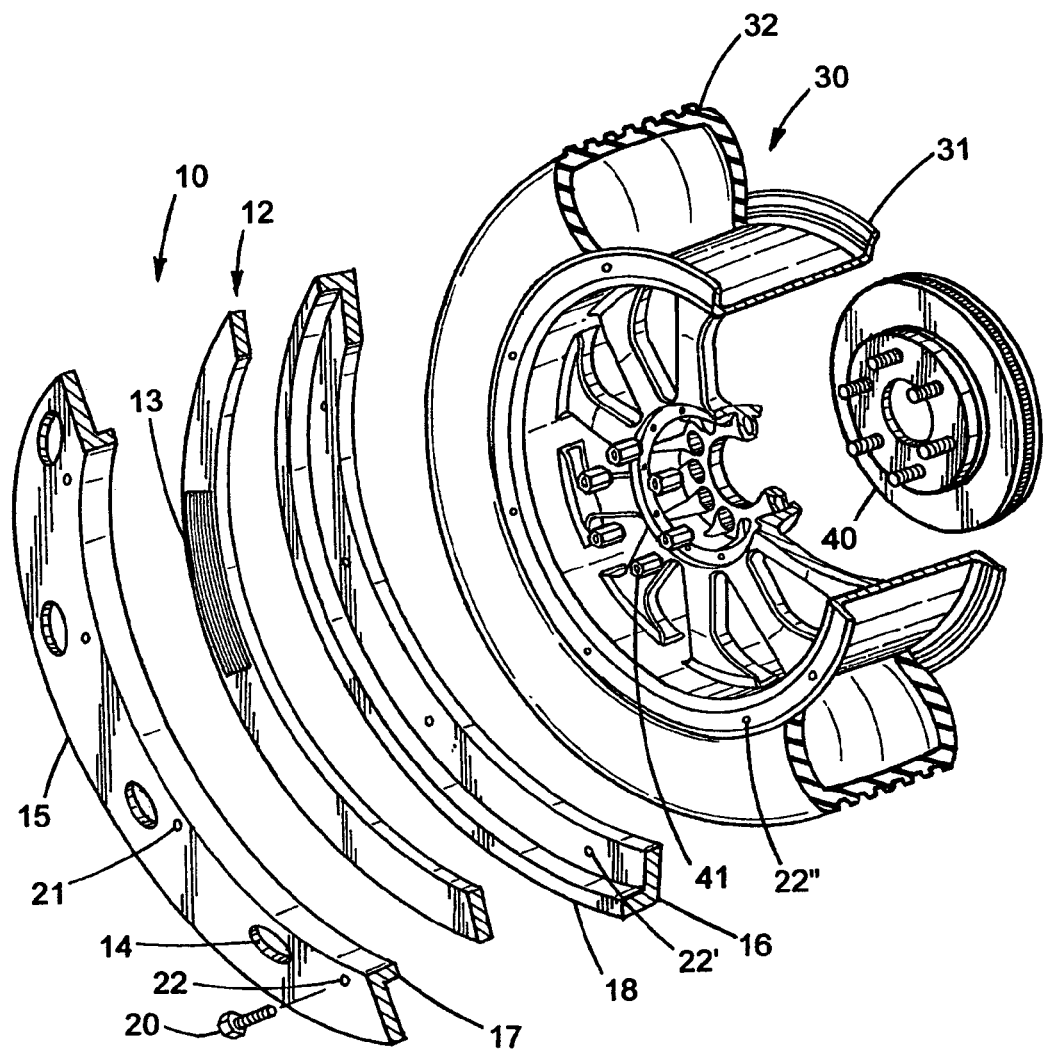
FIG. 1 is a partial isometric cross sectioned exploded view of an embodiment of the spinning device 10 mounted on an automotive wheel wherein the spinning device is sized to hide a portion of the tire 32 and leave open to view a major portion of the wheel.

FIG. 1 shows one embodiment of invention for the wheel spinning device 10 associated with an automotive wheel 31 and tire 32 (30). This embodiment is comprised of a back ring 16, a front ring 15, with decorative holes 14 positioned therein. Positioned between the back ring and the front ring is a spinning flat ring, 12 that has at least one portion of the front face thereof a contrasting color 13. Interposed between the front and back plates are two spacers an inner spacer 17, and an outer spacer 18. As shown the spacers can be formed from continuous rings and be formed as part of the front and back rings. They can also be formed of individual parts that are spaced from one another and secured around the inner faces of the front and back rings. The spinning ring 12 is rotatably fitted in the housing such that its outer diameter does not touch the outer spacer 18 and its inner diameter sits on bearings 19 that are secured around the inner spacer 17. The spinning ring 12 should not touch the inner surfaces of the front and back rings. When the device is assembled it forms a housing 11 with the spinning ring 12 located in the interior (See FIG. 2). The inner diameter of the spinner sits on bearings 19 so that it can spin (rotate) independently of the housing and the wheel. The housing is fixed to the wheel and rotates with the wheel. Preferably the spinning device is removable from the wheel to facilitate tire changes and the like.

The back ring, front ring and rotatable spinning ring are designed to be assembled into a unit in a manner that the rotatable spinning ring 12 starts to rotate when the wheel is rotating and continues to rotate for a time when the wheel stops.

The spinning device 10 is mounted onto a wheel, in this embodiment by the use of bolts 20 that pass through the front ring and back ring through holes 22 and 22' and attach to the rim at threaded locations 22" that align with the holes going through the housing. Other means of fastening the device to the rim can be employed such as with spring clips and the like.

Figure 3:
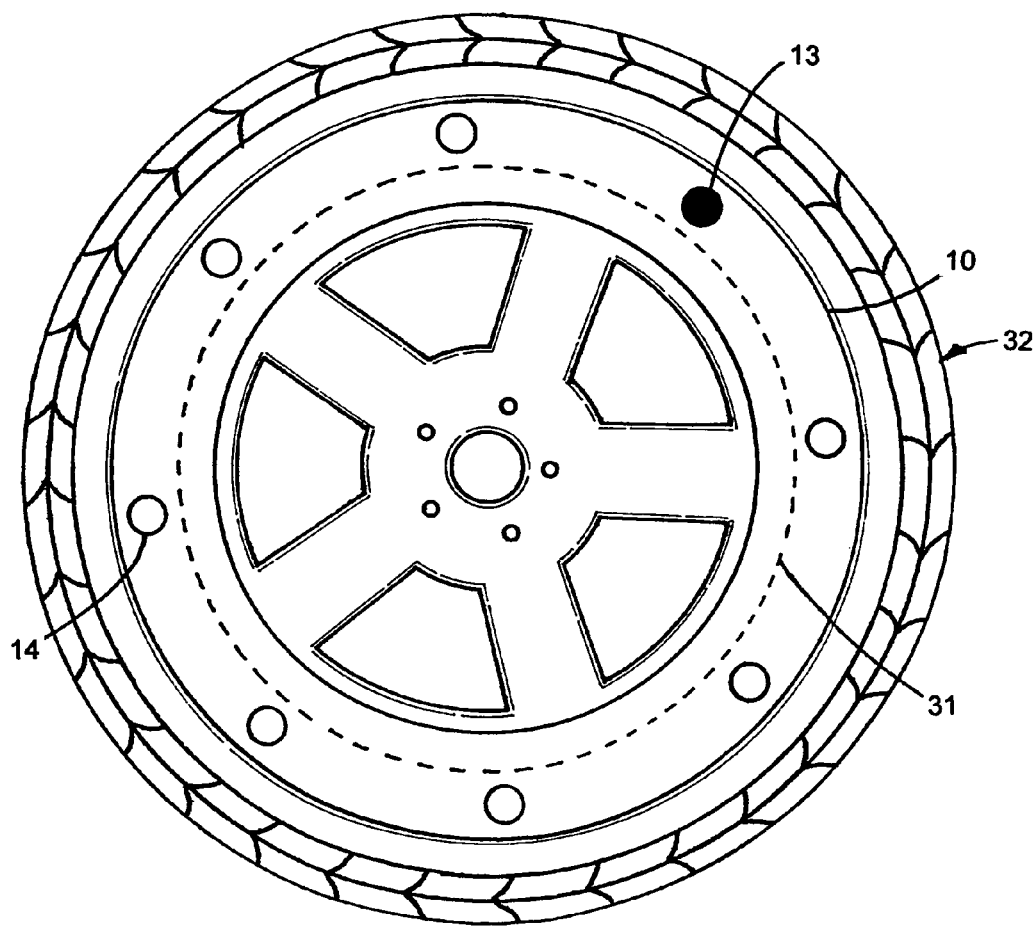
FIG. 3 is front view of the spinning device 10 attached to a rim and partially hiding a tire 32 and leaving an open view of a majority of the wheel. The dashed line depicts the outer circumference of the rim.
Figure 4:
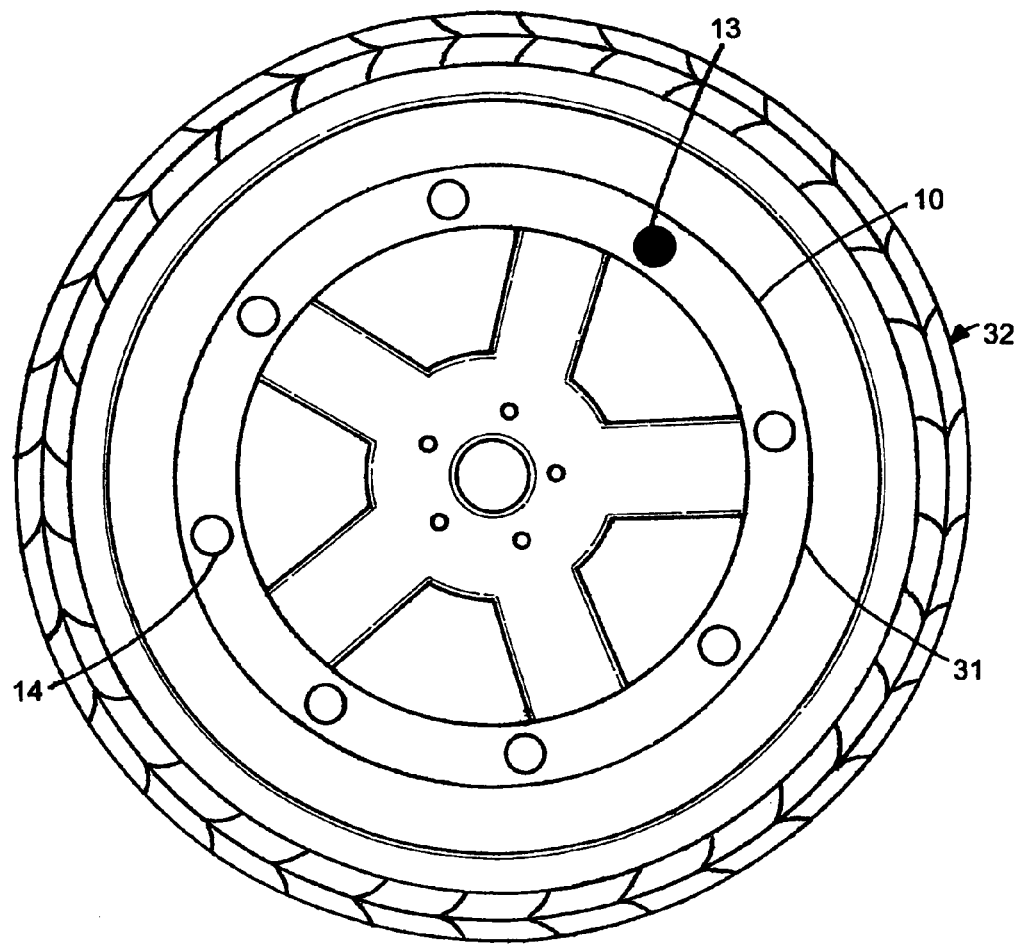
FIG. 4 is a front view of another embodiment where the spinning device has an outer circumference approximately the same size as the outer circumference of the rim and an inner circumference of a size that hides at least a portion of the rim.

In the embodiments shown in FIG. 1 and FIG. 3 the dimensions of the spinning device 10 are such that it covers (hides) a portion of the tire and a minimal portion of the wheel. In other embodiments as shown in FIG. 4 for example, the spinning device may only cover a portion of the wheel or in another embodiment, not shown, a portion of both the wheel and the tire.

The rim is provided with conventional brake rotor 40 and lug nuts 41 that are standard in the automotive industry.

The spinning device of the invention can be formed of any suitable material that spinners are normally made of, such as steel, die cast iron, aluminum (and alloys thereof), die cast zinc and the like. They can be chromed or painted to suit the particular vehicle that they will be used with. In a preferred embodiment the housing and spinning ring as well as the spacers are made from aluminum.

The wheel can be of any standard design, solid, spokes, wire wheels or he like as long as it is provided with the threaded holes 22" to fit the bolts of the spinning device of the invention. As previously mentioned clips or other forms of attachment of the spinning device to the wheel can be used as long as it does not interfere with the spinning of the spinning ring 12.

Figure 2:
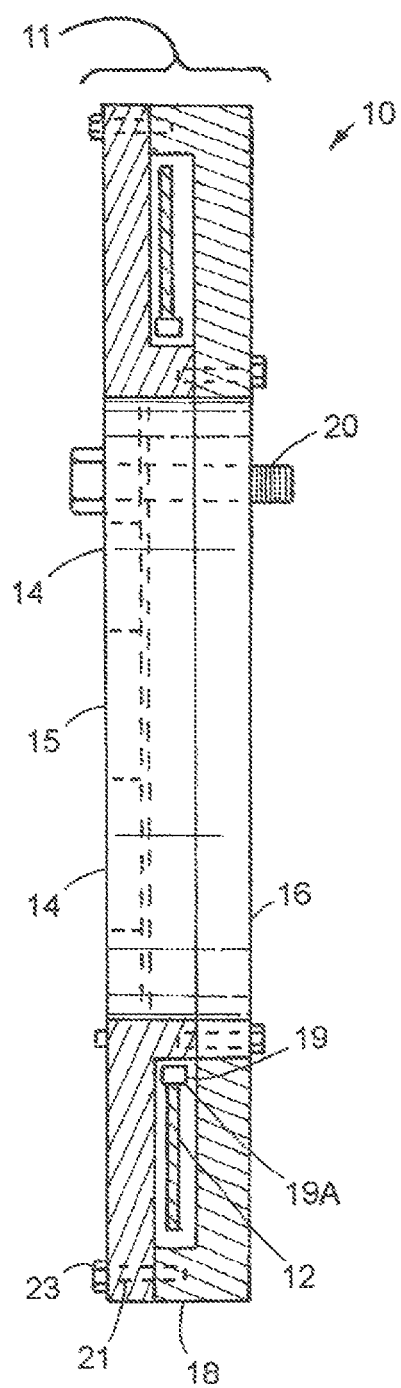
FIG. 2 is a cross-sectional side view of the embodiment of the spinning device 10 taken along an arbitrary centerline.

As shown in FIG. 2 bearings 19, are secured around the inner spacer 17. The spinner bearings 19 are preferably ball bearings as are known in the art. Idler bearings where the outer ring rotates and the inner ring is stationary are suitable. These bearings are available on the market and can be bolted or otherwise affixed, such as by bolting, to either the front ring or the back ring. Preferably at least four idler bearings are equally spaced around the front or back ring on a circumference that permits the inner circumference of the spinning ring to sit on each bearing so as to support and allow the spinning ring to rotate. Generally there is sufficient friction in these bearings to cause the spinning ring to start to rotate when the wheel rotates and then there is sufficient momentum in the spinning ring to continue to rotate for a time after the wheel stops rotating. Bearings having a very low friction are preferred. The bearings in this embodiment contain a groove 19A which provides a place for the inner circumference of the spinning ring 12 to securely rest and be maintained in alignment so as not to touch or rub on the inner surfaces of the housing. The inner circumference of the spinning ring 12 is fitted to the bearings in a manner to allow it to freely rotate in the housing without touching any of the inner surfaces of the housing except for the bearings.

The housing 11 is held together by any suitable fastening means. It can be welded or for example held together with fasteners such as threaded screws 23, FIG. 2, which fit through holes 21, provided in the front and back rings. Rivets can also be used. The device can also be held together with adhesives and or welded.

The spinning device 10 can be made essentially weather resistant by providing a weather tight closed housing. 0-rings can be provided between the contacting surfaces of the front and back rings and surfaces of the spacers. The apertures 14 in the front ring can be sealed with the use of a clear plastic such as a polycarbonate so the contrasting color 13 on the ring 12 will still show through.

The apertures 14 can be of any desired design. For example they can be formed of letters that spell a name. A stick man can be shown in different positions so that when the ring spins the man appears to be running or walking. They can be formed of lightning bolts shown in different extensions so that the bolt appears to be moving. Other designs can be used.

While the invention has been described in complete detail and pictorially shown in the accompanying drawings, it is not to be limited to such details, since many changes and modifications may be made to the invention without departing from the spirit and scope thereof Hence, it is described to cover any and all modifications and forms which may come within the language and scope of the appended claims.

What is claimed is:

1. A donut shaped spinning device adapted to be attached to a vehicle wheel comprising:
   a donut shaped housing having a front and back ring forming a cavity therein, the front ring containing at least one decorative aperture formed therein,
   a fiat spinning ring having a front surface mounted within said cavity of the housing in a manner that when the housing is attached to said wheel the spinning ring rotates upon rotation of the wheel and said housing and continues to rotate for a time after the wheel and housing stops, said front surface of the spinning ring facing the front ring of said housing having one section of a contrasting color to the remainder of the spinning ring such that when it rotates the colors showing through said at least one aperture change during, rotation of the spinning ring, and
   means for attaching the housing to a front side of the vehicle wheel in a manner that the housing rotates with the wheel and the spinning ring rotates separately from the rotation of the housing and continues to rotates for a time after the wheel and housing stops rotating.

2. The spinning device of claim 1 wherein said housing comprises said front ring and said back ring and separating said rings from each other with an outer and inner spacer to provide said cavity.

3. The spinning device of claim 2 wherein the outer and inner spacers comprise rings.

4. The spinning device of claim 1 wherein said housing is weather resistant.

5. The spinning device of claim 1 including bearings upon which the inner circumference of said spinning ring rest to provide the means for said spinning ring to spin upon the rotation of the wheel and continue to spin for a time after the wheel stops rotating.

6. The spinning device of claim 5 wherein the bearings are idler bearings that are affixed to the front ring or to the back ring.

7. The spinning device of claim 1 wherein said front ring has a series of apertures formed therein.

8. The spinning device of claim 1 having outer and inner dimensions such that when attached to a Wheel the device hides a portion of a tire mounted on said wheel.

* * * * *